April 29, 1941.  J. P. LANNEN  2,240,337
UNIVERSAL LEVEL
Filed Jan. 29, 1940
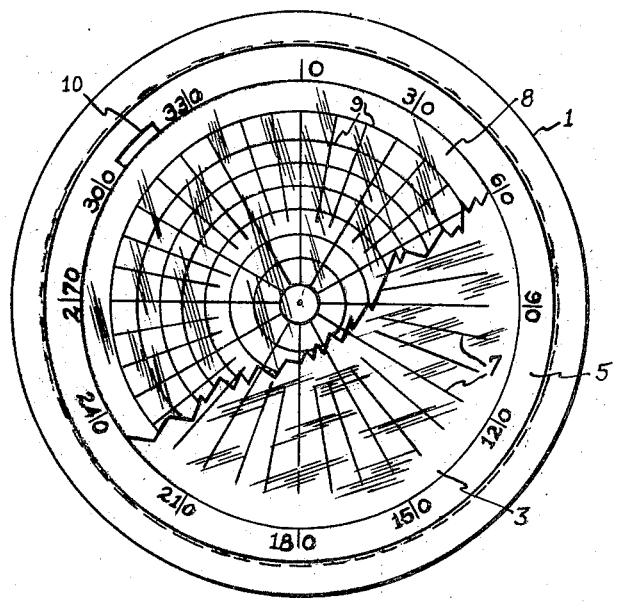
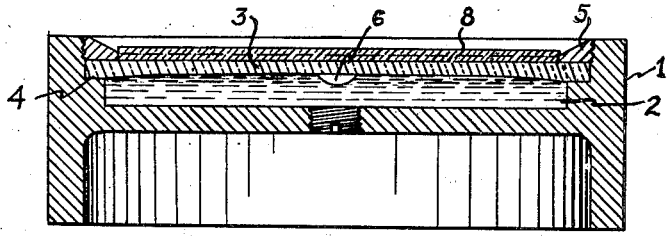
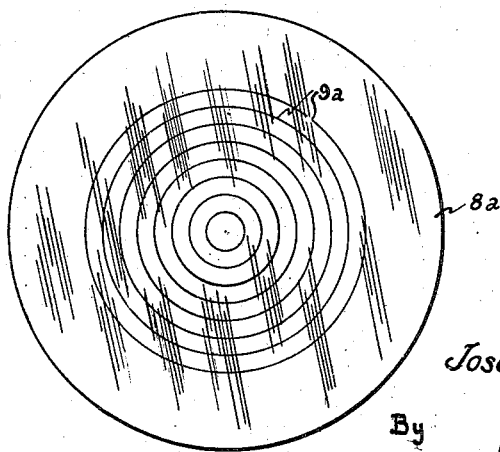
Inventor
Joseph P. Lannen Patented Apr. 29, 1941

2,240,337

UNITED STATES PATENT OFFICE 2,240,337

UNIVERSAL LEVEL

Joseph P. Lannen, Detroit, Mich.

Application January 29, 1940, Serial No. 316,292

5 Claims. (Cl. 33—212)

This invention relates to universal levels and particularly universal levels of a bubble type.

In associating a universal level with a body subject to tilting or deviations from the horizontal in any direction, it is desirable to provide for accurately indicating the direction of tilting and also measuring the deviation. Thus levels are employed in which a bubble is confined beneath a transparent disk graduated both radially and circumferentially to indicate direction and degree of travel of the bubble, such levels being used on work balancers and having other applications.

In employing such levels on universally pivoted work balancers, different types of work undergo differential tilting responsive to the same factor of unbalance, such differential response being due either to weight differences or shape differences in the types of work, or to both such differences. When the type of work to be balanced is changed materially from time to time, it is necessary to also change the level, at least with respect to its graduations, indicating tilting, so that indications may remain accurate and intelligible. Thus for example, if the level is applied to a tire balancing machine, graduations suited to indicate tilting of heavy tires may be quite unsuited for testing light ones. Quite commonly, therefore, a manufacturer using a balancing machine for testing different classes of products varying materially as to balancing moments (i. e. product of weight by the distance from the center of gravity of the work to the universal pivot of the machine), is obliged to keep on hand a number of universal levels for selective use on the machine.

An object of the invention is to provide a universal level of the bubble type having a provision for quickly and easily changing its indications of angular deviation, to suit such indications to different conditions of use of the level.

Another object is to provide a universal level with a set of permanent graduations for indicating the direction of a tilting movement of the level, and with interchangeable sets of relatively different graduations for measuring extent of such movement.

A further object is to provide a universal level having a liquid and bubble chamber and a transparent cover permanently confining the liquid and bubble in such chamber, and having an additional graduated transparent cover freely resting on the permanent cover, and readily removable to afford substitution of a differently graduated cover.

These and various other objects are attained by the construction hereinafter described and illustrated in the accompanying drawing, wherein:

Fig. 1 is a top plan view of the improved level, with a portion of its uppermost transparent disk broken away to afford a clear disclosure of graduations on the lower disk.

Fig. 2 is a diametrical vertical sectional view of such level, taken on the line 2—2 of Fig. 1.

Fig. 3 is a top plan view of a circumferentially graduated cover disk which may replace that shown in Fig 1, the two plates differing as to location and spacing of the graduations.

In these views, the reference character 1 designates a shallow circular vessel containing a body of liquid 2, such as alcohol, confined beneath a glass disk 3 seated on an annular shoulder 4 formed interiorly of said vessel. Said disk is clamped firmly on the shoulder and in liquid-sealed relation to the vessel 1 by a ring 5 threaded into the top portion of the vessel. The lower and liquid-engaging face of the disk 3 is spherically concaved so that a bubble 6 of air or other suitable gas trapped in the liquid, tends to assume a position at the vertical axis of the instrument, when the same is level. Any tilting of a work carrier (not shown) or other member to which the described instrument is secured produces radial travel of the bubble 6 in the direction of upward tilting, and the extent of tilting may obviously be measured by the bubble travel.

To afford a definite indication of the direction of such travel there is provided on the disk 3 a set of radial graduations 7 extending from the center to substantially the periphery of the disk, and the relation of these graduations is preferably indicated in angular degrees at their outer ends. Thus, as best appears in Figs. 1 and 2, the inner face of the ring is conically beveled to receive a set of angularly spaced indicia, certain of said radial graduations being extended to such indicia.

Freely resting on the disk 3 and removably fitting within the ring 5, is a second disk 8 of transparent material, its lower face being marked with a set of equally spaced circles 9 all centered at the vertical axis of the instrument, and serving to measure bubble travel from such axis. Preferably the innermost of these circles is substantially equal in diameter to the bubble and thus conforms to the latter when the instrument is level and the bubble at center. The circles may be so spaced that outward advance of the bubble from one to another will correspond to a certain unit of unbalance, as for example, one ounce inch, i. e., the force exerted by a weight of one ounce applied one inch from the vertical axis, thus particularly adapting the instrument to balancing machines.

Fig. 3 illustrates a transparent disk 8a provided with circular graduations 9a, equal in number to those of the disk 8 and equally spaced, but covering an area of considerably less radial extent than that of the circles 9. The disk 8a is suited for testing articles or work pieces having a more stable equilibrium, as mounted on a balancing machine, than those for which the disk 8 would be suited. Similarly, there may be provided other disks, differently graduated for interchangeable use and suited to different types of work. Thus at small additional expense, a manufacturer may adopt a certain static balancing machine for use with different products requiring testing for balance.

To facilitate removal of any disk 8 or 8a from the instrument, it is preferred to notch the inner face of the ring 5 at one or more points 10 so that a pencil or the like may be employed to lift an edge of the disk.

While it would not be impractical to provide both the radial and circular graduations on the removable disk, it is more desirable to dispose the radial lines on the fixed disk, since they thus are always in proper relation to indicia carried by the ring 5.

While particularly described with reference to a work balancing machine, the described level is not limited to such application, and may be further used, for example, as a clinometer for aircraft, the interchangeable disks then adapting it either to light machines or heavier and relatively stable ones.

What I claim is:

1. A universal level comprising an open-topped vessel, a transparent cover plate for such vessel having its bottom face forming a substantially spherical concavity, a liquid in the vessel contacting said bottom face and freely confining a bubble of gas against such face, means establishing a liquid seal between the vessel and margin of the plate, a second transparent cover plate freely resting on the first mentioned plate and marked with concentric circular graduations for measuring the extent of outward travel of the bubble upon tilting of the level, and confined to center the graduations substantially at the central axis of said concavity.

2. A universal level as set forth in claim 1, said plates occupying the upper portion of said vessel.

3. In a universal level as set forth in claim 1, a ring detachably secured within the upper portion of the vessel, clamping the lower of said plates on the vessel and maintaining the liquid-seal of such lower plate with the vessel.

4. In a universal level as set forth in claim 1, a ring rigidly and detachably mounted on the vessel and clamping the lower of said plates on the vessel, the upper of said plates being loosely fitted within such ring and thus held in proper relation to the lower plate.

5. A universal level as set forth in claim 1, the lower plate being formed with a plurality of radial graduations for accurately indicating the direction of travel of the bubble, on tilting the level.

JOSEPH P. LANNEN.